Patented Oct. 28, 1952

2,615,878

UNITED STATES PATENT OFFICE 2,615,878

COPOLYMERS OF VINYLIDENE CYANIDE WITH 1,2-DIHALO ETHYLENES

Vernon L. Folt, Akron, Ohio, assignor to The B. F. Goodrich Company, New York, N. Y., a corporation of New York No Drawing. Application October 27, 1950, Serial No. 192,634

13 Claims. (Cl. 260—78.5)

This invention relates to the preparation of novel copolymers of vinylidene cyanide with 1,2-dihalo ethylenes, particularly cis and transdichloro ethylenes, which copolymers are extremely useful resinous materials.

In U. S. Patents 2,476,270 and 2,502,412, to Alan E. Ardis, and 2,514,387 to Harry Gilbert, novel methods for the preparation of monomeric vinylidene cyanide are disclosed. In a copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical characteristics will copolymerize with 1,2-dihalo ethylenes in the presence of a free radical catalyst to give new and highly useful copolymers.

1,2-dihalo ethylenes such as cis and trans-dichloroethylene do not readily polymerize to form solid polymers when heated with a peroxide catalyst. If vinylidene cyanide is also present, however, according to this invention, copolymerization occurs quite readily in the presence of peroxygen catalysts to form highly useful resinous copolymers.

The 1,2-dihalo ethylenes which are polymerized with vinylidene cyanide in accordance with the present invention possess the structure

wherein each X is a halogen atom. Included within this class of compounds are the cis and trans-1,2-dichloroethylenes, 1,2-dibromo ethylene, 1,2-difluoro ethylene, 1,2-diiodoethylene, and the like. Because of the fact that they may be obtained commercially in large quantities and at relatively low prices, the cis and trans-dichloro ethylenes are especially preferred for use in the polymerization with vinylidene cyanide. However, it is to be understood that the other 1,2-dihalo ethylenes disclosed hereinabove may also be polymerized with vinylidene cyanide with good results.

The polymerization itself may be carried out in several different ways. For example, one preferred method consists simply in heating a mixture of the monomers and polymerization catalyst, without the use of a solvent or other liquid medium for the monomers, to effect the polymerization. The polymerization occurs readily at temperatures of about 20° C. to 100° C., the copolymer forming generally as a hard, white, resinous powder of small particle size.

A second method of polymerization consists in first dissolving the vinylidene cyanide and the 1,2-dihalo ethylene in benzene or other liquid aromatic solvent, such as, toluene, methyl toluene, trichloro benzene, or the like, preferably free from impurities which initiate the ionic polymerization of the monomer and in an amount such that the solvent comprises approximately 30% to 80% by weight of the total solution. A polymerization catalyst is included in the solution and the resulting mixture is maintained at the desired temperature, whereupon polymerization occurs to form the desired copolymer. The copolymer thus formed may be separated from the polymerization medium simply by filtering, or, if desired, the solvent may be removed by an evaporation process. Also, the polymerization may be effected at temperatures as low as 0° C. or lower, or as high as 100° C. or even higher, providing a catalyst is utilized which will dissociate into free radicals at the polymerization temperature.

The respective quantities of 1,2-dihalo ethylenes and vinylidene cyanide in any polymerization charge are not critical since a useful copolymer is obtained regardless of the amount of either monomer in the charge, as will be demonstrated in the examples hereinbelow. The amount of vinylidene cyanide in the monomer charge may be as low as 0.1 mole per cent or as high as 99 mole per cent while still obtaining copolymers differing markedly in properties from straight homopolymers of either the 1,2-dihalo ethylene or the vinylidene cyanide.

It is to be understood, of course, that regardless of the polymerization method utilized, the polymerization should be stopped before either of the monomers is entirely consumed, in order that true copolymer will be obtained. Otherwise, when either of the monomers is completely used up, the product will contain straight polymer obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

The catalyst which is utilized in the polymerization process is preferably a peroxygen compound, such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like. In general, from 0.01 to 2.0% by weight of the catalyst, based on the weight of the monomers, is utilized, although smaller or larger amounts may be utilized if desired.

The following examples illustrate the preparation of copolymers of vinylidene cyanide with 1,2-dihalo ethylenes in accordance with this invention, but are not to be construed as a limitation upon the scope thereof, for there are, of course, numerous possible variations and modifications.

EXAMPLES I TO VIII

A series of 8 vinylidene cyanide:dichloro ethylene copolymers is prepared by mixing varying amounts of both monomers with 0.15% (based on the total weight of the monomers) of o,o'-dichlorobenzoyl peroxide and maintaining the resulting mixture at a temperature of about 40° C. in an air atmosphere for a period of about 20 hours. The solid, resinous copolymer obtained at the end of this period is then analyzed to determine its composition. The mole per cent vinylidene cyanide in the polymerization charge, the polymerization time, the per cent conversion, the per cent nitrogen in the copolymer and the mole per cent vinylidene cyanide in the copolymer are recorded in the following table:

*Table I*

| Example | Mole Percent Vinylidene Cyanide in Polymerization Charge | Time (Hours) | Percent Conversion | Percent Nitrogen in Copolymer | Mole Percent Vinylidene Cyanide In Copolymer |
|---|---|---|---|---|---|
| I | 6.142 | 24.75 | 0.08 | 25.33 | 74.95 |
| II | 6.142 | 24.75 | 0.13 | 27.81 | 81.00 |
| III | 12.13 | 21.0 | 0.98 | 32.63 | 92.65 |
| IV | 12.13 | 21.0 | 1.10 | 32.23 | 91.59 |
| V | 29.31 | 21.0 | 0.25 | 31.86 | 90.78 |
| VI | 55.40 | 21.0 | 6.2 | 33.62 | 94.79 |
| VII | 78.83 | 21.0 | 5.7 | 33.77 | 95.20 |
| VIII | 91.94 | 21.0 | 8.2 | 33.46 | 94.40 |

EXAMPLES IX TO XVI

Examples I to VIII are repeated utilizing trans-dichloro ethylene in place of the cis isomer utilized in Examples I to VIII. A hard, resinous copolymer is again obtained. The pertinent data is tabulated below.

*Table II*

| Example | Mole Percent Vinylidene Cyanide in Polymerization Charge | Time (Hours) | Percent Conversion | Percent Nitrogen in Copolymer | Mole Percent Vinylidene Cyanide In Copolymer |
|---|---|---|---|---|---|
| IX | 6.142 | 295 | 0.05 | 27.85 | 81.10 |
| X | 12.13 | 311 | 0.58 | 30.29 | 87.05 |
| XI | 12.13 | 311 | 0.28 | 30.67 | 87.91 |
| XII | 18.01 | 295 | 0.15 | 31.32 | 89.55 |
| XIII | 29.31 | 295 | 2.25 | 32.55 | 92.41 |
| XIV | 55.40 | 71 | 0.40 | 32.71 | 92.76 |
| XV | 78.63 | 71 | 4.5 | 33.62 | 94.81 |
| XVI | 91.94 | 72 | 2.4 | 32.77 | 92.85 |

When other 1,2-dihalo ethylenes selected from those disclosed hereinabove are substituted for cis and trans-dichloro ethylenes in the above examples solid, resinous copolymers are again obtained. Likewise, when the polymerization is carried out according to other of the methods disclosed hereinabove or utilizing other of the peroxygen catalysts disclosed excellent results are achieved.

It will be noted from the examples that the copolymers of the present invention are unique in that they contain high mole percentages of vinylidene cyanide even though only very small amounts of vinylidene cyanide are present in the polymerization charge.

As disclosed hereinabove the copolymers prepared according to the method of the present invention are extremely useful resinous materials. For example, they may be utilized in the melt or solvent spinning of excellent filaments and in the preparation of films as well as for many other uses.

Although specific examples of the invention have been herein described, it is not intended to limit the invention solely thereto, but to include all of the variations and modifications falling within the spirit and scope of the appended claims.

I claim:

1. A two component copolymer of vinylidene cyanide with a 1,2-dihalo ethylene, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

2. A two component copolymer of vinylidene cyanide with a 1,2-dichloro ethylene, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

3. A two component copolymer of vinylidene cyanide with cis dichloro ethylene, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

4. A two component copolymer of vinylidene cyanide with trans dichloro ethylene, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

5. The method which comprises mixing together vinylidene cyanide, which is a liquid at room temperature and a crystalline solid at 0° C., having a melting point when in purest form of substantially 9.0° C. to 9.7° C. and is characterized chemically by the ability to undergo on contact with water at room temperature an instantaneous homopolymerization reaction to give a solid, water-insoluble resin, and a 1,2-dihalo ethylene, in the presence of a peroxygen catalyst, whereupon polymerization occurs to form a two component copolymer of vinylidene cyanide and said 1,2-dihalo ethylene.

6. The method which comprises mixing together vinylidene cyanide, which is a liquid at room temperature and a crystalline solid at 0° C., having a melting point when in purest form of substantially 9.0° C. to 9.7° C. and is characterized chemically by the ability to undergo on contact with water at room temperature an instantaneous homopolymerization reaction to give a solid, water-insoluble resin, and a 1,2-dichloro ethylene, in the presence of a peroxygen catalyst, whereupon polymerization occurs to form a two component copolymer of vinylidene cyanide and said 1,2-dichloro ethylene.

7. The method which comprises mixing together vinylidene cyanide, which is a liquid at room temperature and a crystalline solid at 0° C., having a melting point when in purest form of substantially 9.0° C. to 9.7° C. and is characterized chemically by the ability to undergo on contact with water at room temperature an instantaneous homopolymerization reaction to give a solid, water-insoluble resin, and a 1,2-dichloro ethylene, and maintaining the mixture at a temperature of from 20° C. to 100° C., in the presence of a peroxygen catalyst, whereupon polymerization occurs to form a two component copolymer of vinylidene cyanide and said 1,2-dichloro ethylene.

8. The method of claim 7 wherein the 1,2-dichloro ethylene is cis dichloro ethylene and the peroxygen catalyst is o,o'-dichlorobenzoyl peroxide.

9. The method of claim 7 wherein the 1,2-dichloro ethylene is transdichloro ethylene and the peroxygen catalyst is o,o'-dichlorobenzoyl peroxide.

10. A two component copolymer of vinylidene cyanide with a 1,2-dihalo ethylene, the vinylidene cyanide units in said copolymer being derived from monomeric vinylidene cyanide which is a crystalline solid at 0° C., having a melting point when in purest form of substantially 9.0° to 9.7° C. and being characterized chemically by the ability to undergo on contact with water at room temperature an instantaneous homopolymerization reaction to give a solid, water-insoluble resin, said copolymer containing from about 75 to 95 mole per cent of vinylidene cyanide.

11. The copolymer of claim 10 wherein the 1,2-dihalo ethylene is a 1,2-dichloro ethylene.

12. The copolymer of claim 11 further characterized in that the 1,2-dichloro ethylene is cis dichloro ethylene.

13. The copolymer of claim 11 further characterized in that the 1,2-dichloro ethylene is trans dichloro ethylene.

VERNON L. FOLT.

REFERENCES CITED

The following references are of record in the file of this patent:

UNITED STATES PATENTS

| Number | Name | Date |
|---|---|---|
| 2,396,785 | Hanford | Mar. 19, 1946 |
| 2,466,395 | Dickey | Apr. 5, 1949 |

FOREIGN PATENTS

| Number | Country | Date |
|---|---|---|
| 853,473 | France | Apr. 25, 1939 |